United States Patent
Hopton et al.

(10) Patent No.: US 6,199,940 B1
(45) Date of Patent: Mar. 13, 2001

(54) TUBULAR STRUCTURAL REINFORCING MEMBER WITH THERMALLY EXPANSIBLE FOAMING MATERIAL

(75) Inventors: Gregory W. Hopton, Novi, MI (US); Norman E. Blank, Wayne, NJ (US); Gerald Fitzgerald, Clinton Township, MI (US); Randy Stratman, Waterford, MI (US); Chin-Jui Chang, Troy, MI (US)

(73) Assignee: Sika Corporation, Madison Heights, MI (US)

( * ) Notice: Subject to any disclaimer, the term of this patent is extended or adjusted under 35 U.S.C. 154(b) by 0 days.

(21) Appl. No.: 09/494,808

(22) Filed: Jan. 31, 2000

(51) Int. Cl.$^7$ ........................................................ B60J 7/00
(52) U.S. Cl. ................. 296/187; 296/203.01; 296/146.6; 428/34.1; 428/906
(58) Field of Search ..................................... 296/187, 204, 296/205, 146.6, 203.01; 428/34.1, 906

(56) References Cited

U.S. PATENT DOCUMENTS

| | | |
|---|---|---|
| 3,493,257 | 2/1970 | Fitzgerald et al. . |
| 4,019,301 | 4/1977 | Fox . |
| 4,610,836 | 9/1986 | Wycech . |
| 4,695,343 | 9/1987 | Wycech . |
| 4,732,806 | 3/1988 | Wycech . |
| 4,737,407 | 4/1988 | Wycech . |
| 4,751,249 | 6/1988 | Wycech . |
| 4,769,391 | 9/1988 | Wycech . |
| 4,836,516 | 6/1989 | Wycech . |
| 4,853,270 | 8/1989 | Wycech . |
| 4,861,097 | 8/1989 | Wycech . |
| 4,901,500 | 2/1990 | Wycech . |
| 4,908,930 | 3/1990 | Wycech . |
| 4,922,596 | 5/1990 | Wycech . |
| 4,923,902 | 5/1990 | Wycech . |

(List continued on next page.)

FOREIGN PATENT DOCUMENTS

| | | |
|---|---|---|
| 2114888 | 2/1994 | (CA) . |
| 2749263 | 5/1996 | (FR) . |

OTHER PUBLICATIONS

Side view photograph of admitted prior art automobile rail reinforcing member with adhesively attached thermally expandable reinforcing material after brake–out but not shown positioned within the rail No Date.

Perspective view of admitted prior art automobile rail reinforcing member with adhesively attached thermally expandable reinforcing material after bake–out but not shown positioned within the rail No Date.

Photograph of section of admitted prior art SUV crossmember reinforcing member with adhesively attached thermally expandable material after bake–out located between metal structural parts of an automobile No Date.

Photograph of section of admitted prior art SUV crossmember reinforcing member with adhesively attached thermally epxandable material after bake–out located between metal structural parts of an automobile No Date.

*Primary Examiner*—Joseph D. Pape
*Assistant Examiner*—Kiran Patel
(74) *Attorney, Agent, or Firm*—Hovey, Williams, Timmons & Collins

(57) ABSTRACT

A reinforcing member for receiving thereon a thermally expansible reinforcing material includes a tubular carrier and a fastener mechanically affixing the reinforcing material to the carrier. The tubular carrier preferably has a continuous arcuate wall with the reinforcing material received on the exterior thereof. The reinforcing material may be provided as a plurality of longitudinally spaced annular elements, an elongated sleeve, or a plurality of prism-shaped elements. Upon heating, the reinforcing material expands and bonds the carrier to the structural member to provide additional strength and stiffness.

18 Claims, 3 Drawing Sheets

U.S. PATENT DOCUMENTS

| | | |
|---|---|---|
| 4,964,514 | 10/1990 | Wycech . |
| 4,978,562 | 12/1990 | Wycech . |
| 4,995,545 | 2/1991 | Wycech . |
| 5,102,163 * | 4/1992 | Ishikawa ............................ 296/146.6 |
| 5,124,186 | 6/1992 | Wycech . |
| 5,194,199 | 3/1993 | Thum . |
| 5,213,391 | 5/1993 | Takagi . |
| 5,344,208 | 9/1994 | Bien et al. . |
| 5,575,526 | 11/1996 | Wycech . |
| 5,635,562 | 6/1997 | Malcolm . |
| 5,755,486 | 5/1998 | Wycech . |
| 5,766,719 | 6/1998 | Rimkus . |
| 5,857,734 * | 1/1999 | Okamura et al. ................. 296/146.6 |
| 5,884,960 | 3/1999 | Wycech . |
| 5,888,600 | 3/1999 | Wycech . |
| 5,992,923 | 11/1999 | Wycech . |
| 6,003,274 | 12/1999 | Wycech . |
| 6,058,673 | 5/2000 | Wycech . |
| 6,068,424 * | 5/2000 | Wycech ............................... 296/187 |

\* cited by examiner

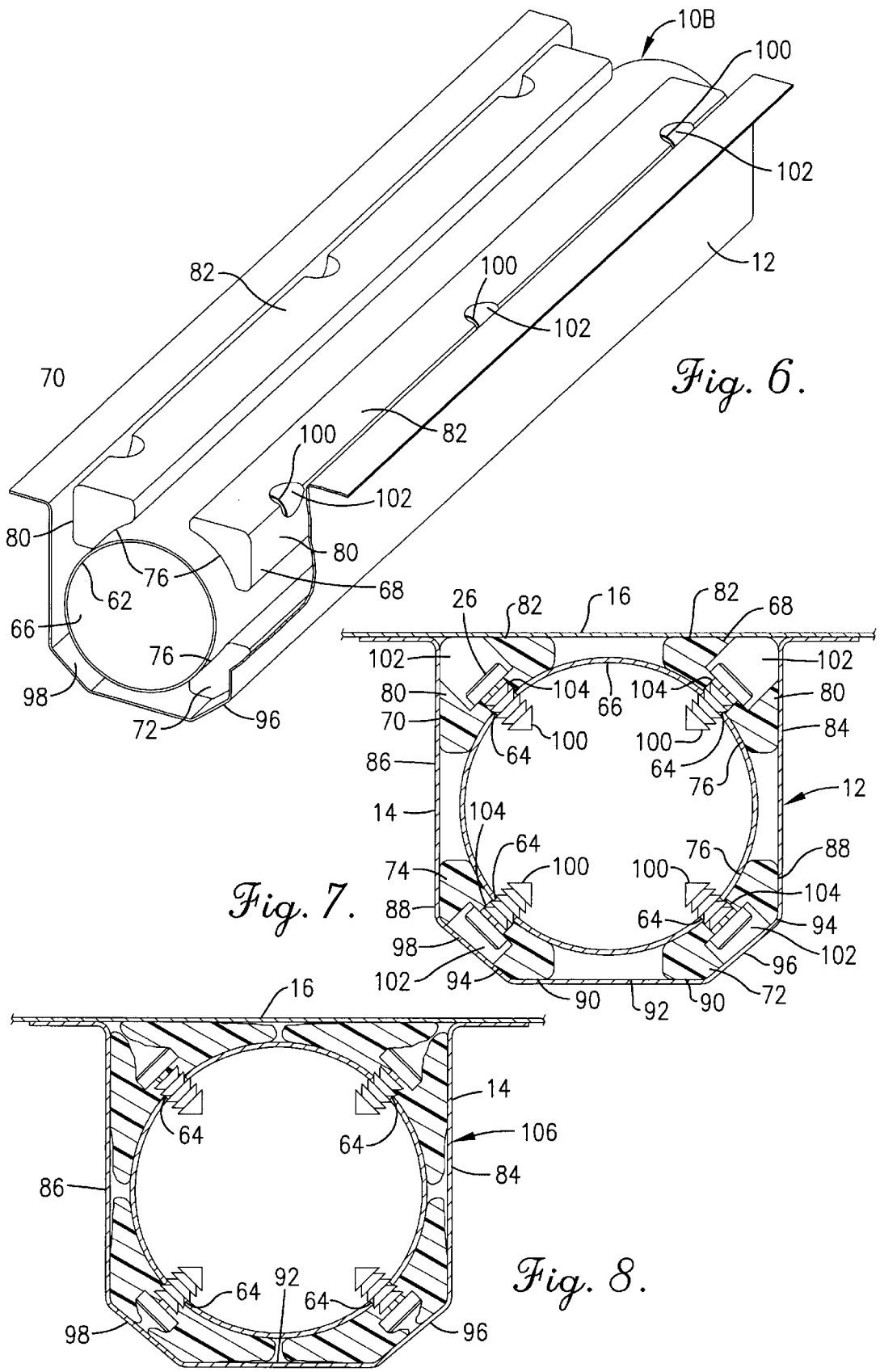

TUBULAR STRUCTURAL REINFORCING MEMBER WITH THERMALLY EXPANSIBLE FOAMING MATERIAL

BACKGROUND OF THE INVENTION

1. Field of the Invention

This invention concerns the use of thermally expansible foaming materials, particularly thermally expansible foaming structural reinforcing materials, which are coupled to a tubular carrier to provide additional localized stiffness to frames, rails, cavities and other structural members. Such a member may be useful in architectural, automotive, aviation, marine, or any other applications where increased support or stiffness would reduce vibration, noise, and/or fatigue propagation, or would provide reinforcement to enhance structural strength or provide energy management during crash, crush, or impact encounters.

2. Description of the Prior Art

It has long been recognized that foamable materials may be used to bond together separate components. Structural foams, urethanes and other thermally expansible foaming materials have been used to enhance acoustic performance and provide structural rigidity. Examples of thermally expansible structural reinforcing materials used on carriers in the automotive field are illustrated in U.S. Pat. No. 5,194,199 to Thum, U.S. Pat. No. 5,344,208 to Bien et al., and U.S. Pat. Nos. 5,575,526 and 5,755,486 to Wycech. Another example of the use of thermally expansible materials on a carrier and used primarily as a baffle composition is shown in U.S. Pat. No. 5,506,025 to Otto et al. An example of the use of a foamable material on a beam-shaped structure in a piling is shown in U.S. Pat. No. 4,019,301 to Fox et al.

While such showings disclose various uses of expansible materials in reinforcing, baffling and sealant applications, there has developed a need for a simplified reinforcing member which will provide stiffening and reinforcement to a surrounding structural member. The use of expansible reinforcing materials which are initially dry and non-tacky are preferred in the manufacturing context. Such materials having shipping and handling advantages; notably this type of reinforcing material does not readily adhere to shipping containers, to workers during manufacture and installation, or to other critical surfaces which may come into contact with the material. By being non-tacky, these materials will not readily retain dirt, dust or other contaminants. Additionally, these materials will not readily adversely adhere to a carrier positioned within the structural member which helps to position the reinforcing member prior to expansion of the reinforcing material.

SUMMARY OF THE INVENTION

The reinforcing member of the present invention provides significant advantages in manufacturing, handling and use over prior carrier and expansible foaming reinforcing material combinations. In particular, the present invention enjoys the benefits of utilizing an initially non-tacky reinforcing composition and a carrier which readily receives the material and provides excellent load distribution.

Broadly speaking, the present invention includes a tubular carrier, a thermally expansible foaming reinforcing material for bonding to and interconnecting the carrier to a structural member, and a fastener providing mechanical attachment for holding the reinforcing material on the carrier. The tubular carrier has a continuous arcuate wall, and the reinforcing material is preferably initially non-tacky and is thermally expansible and foams, such as by internal chemical reaction or more preferably by the external application of heat. The mechanical attachment serves to inhibit relative movement between the carrier and the reinforcing material and may be variously provided, such as by a tab provided on the tubular carrier or by a separate mechanical fastener, e.g. a push pin. Passages in the reinforcing material enable the fastener to pass therethrough and to secure the reinforcing material to the carrier.

The continuous arcuate wall of the carrier promote good load distribution without excessive weight. The carrier is preferably hollow, with the reinforcing material located exteriorly on the wall. The reinforcing material may be provided alternately configured as annular rings, an elongated sleeve, or elongated prisms which aid in locating the member by their receipt in interior corners of a structural member.

The reinforcing material is thermally expansible, either by internally created thermal energy or by the external application of heat to activate the material. As used herein, the term "thermally expansible" means both internally created thermal energy and the external application of heat to expand and foam the reinforcing material. The thermally expansible reinforcing material is preferably a synthetic resin-based material which foams when subjected to temperatures achieved during baking in a manufacturing process (e.g., such as during the paint and powder coat bake stage of automobile manufacturing processes). Thus, the expansion temperature of the material should be at least about 300° F.

These and other advantages will be readily appreciated by those skilled in the art with reference to the drawings and the following description.

BRIEF DESCRIPTION OF THE DRAWINGS

FIG. 6 is a perspective view of a third embodiment of the present invention showing the reinforcing material arranged as circumferentially spaced elongated prisms coupled to the tubular carrier;

FIG. 7 is a vertical cross-sectional view of the reinforcing member of FIG. 6, showing the reinforcing material in an unexpanded condition; and FIG. 8 is a vertical cross-sectional view similar to FIG. 7, showing the reinforcing material in an expanded condition.

DESCRIPTION OF THE PREFERRED EMBODIMENT

Figure 1:
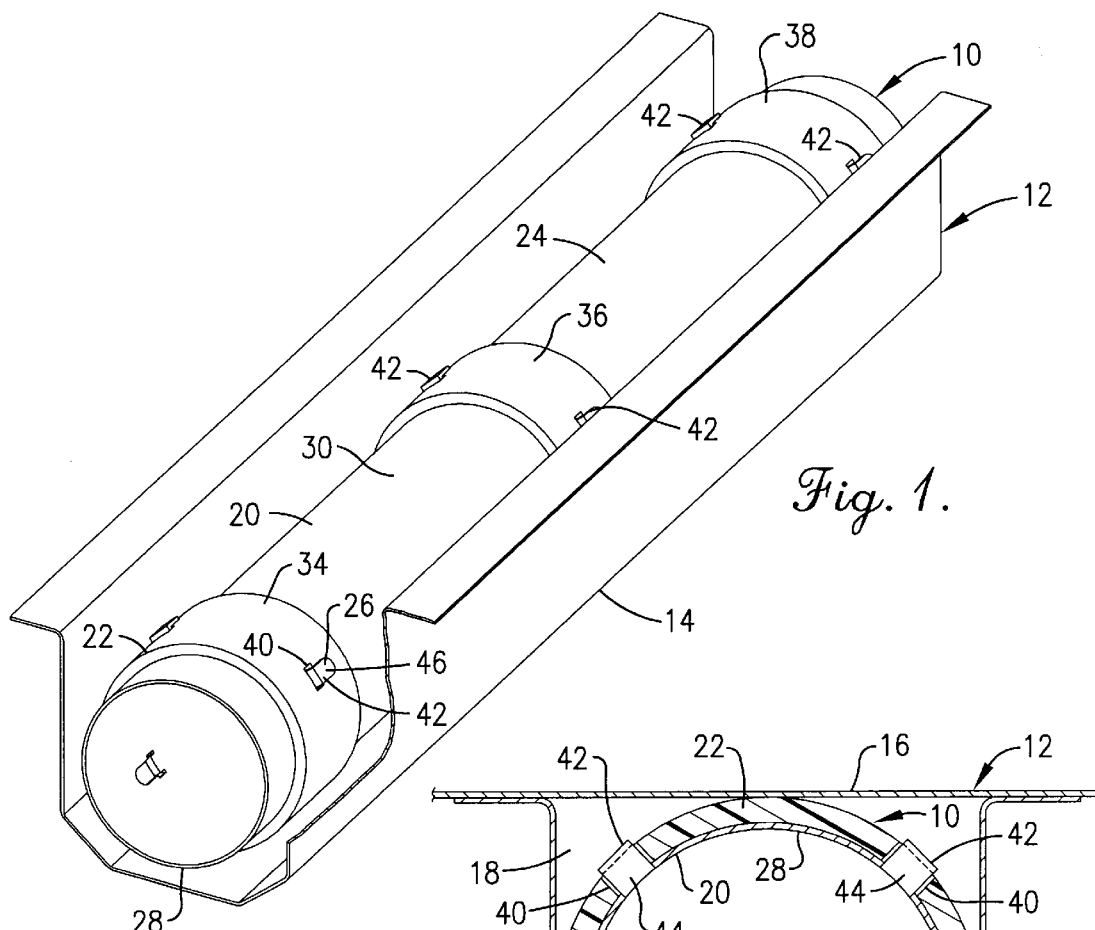
FIG. 1 is a perspective view showing a tubular reinforcing member of the present invention in a channel-shaped structural member, with the carrier of the reinforcing member having reinforcing material arranged as a plurality of longitudinally spaced annular rings.

Referring now to the drawings, a reinforcing member 10 is provided for reinforcing a structural member 12. The structural member 12 as illustrated includes an elongated channel 14 which is enclosed by a flat plate 16 to provide a cavity 18 into which the reinforcing member 10 is received. The reinforcing member broadly includes a tubular carrier 20 which may be of steel, aluminum or other metal, or alternatively of synthetic resin such as nylon. Reinforcing material 22 which is preferably a thermally expansible foaming composition which is initially dry and non-tacky is provided on the exterior side 24 of the carrier 20 and coupled thereto by mechanical attachment provided by a fastener 26.

In greater detail, the carrier 20 as shown herein is a substantially continuous, elongated tube 28 having a continuous arcuate wall 30 defining a hollow interior 32. The carrier may be of different materials and thicknesses depending upon the application, such that a relatively thin wall thickness may be sufficient in some applications while a relatively thick wall may be necessary when the material of the carrier is relatively weak or the structural member would benefit from additional reinforcement thereby. However, because the reinforcing material 22 provides substantially stiffness and strength, a relatively thin carrier wall 30 will be sufficient in many applications. Steel or aluminum provides a good choice of material because of the thermal conductivity and high strength to weight ratio, although nylon and other synthetic resins having a relatively high melting temperature will also be satisfactory in many applications.

The reinforcing material 22 used in the present invention is a dry, initially non-tacky material that develops adhesion upon expansion so that it adheres to the surrounding structural members when activated. Activation may be by heating, such as occurs in automobile assembly plants. When subjected to a temperature of at least about 300° F., thermally expansible foamable materials should have a percent expansion of at least about 40%, preferably at least about 125%, and more preferably from about 150–300%, to provide sufficient structural reinforcement and compressive strength, wherein the percent expansion (as used herein) is defined as:

100×{[(the specific gravity of the material 22 before heating)−(the specific gravity of the material 22 after heating)]/(the specific gravity of the material 22 after heating)}.

One particularly preferred composition for use as material 22 is commercialized under the name SikaReinforcer (Sika Corporation, Madison Heights, Mich.). In more detail, the most preferred material 22 comprises: from about 20–30% by weight of a styrene-butadiene-styrene (SBS) block co-polymer (e.g., Fina Clear 530®); from about 5–20% by weight of a polystyrene (e.g., Fina Crystal 500® and Fina Crystal 535®); from about 30–45% by weight of a bisphenol A-based liquid epoxy resin (e.g. Araldite 6010® and Epon 71®); from about 0.5–5% by weight of a pigment such as carbon black; up to about 5% by weight butadiene acrylonitrile rubber (Nipol 1411), from about 1–10% by weight hydrated amorphous silica (HiSil 233); from about 10–20% by weight glass microspheres (Scotchlite S60); from about 0.1–5% by weight a blowing agent such as azodicarbonamide (e.g., Celogen AZ 765®, Celogen AZ 754A®, and Celogen AZ 130®); from about 0.1 to 5% by weight of a catalyst such as N, N, dimethyl phenyl urea (U405); from about 0.1–5% by weight of a curing agent such as dicyandiamide (DDA10); and up to about 5% by weight of a "kicker" such as zinc oxide to lower the blowing temperature, with all percents by weight being based upon the total weight of the material taken as 100% by weight.

A particularly preferred composition of the material 22 comprises about 12.94% by weight polystyrene, about 23.22% by weight SBS block copolymer, about 0.57% by weight carbon black, about 1.90% by weight butadiene acrylonitrile rubber, about 4.28% by weight hydrated amorphous silica, about 38.07% by weight bisphenol A-based liquid epoxy resin, about 14.75% by weight glass microspheres, about 0.46% by weight zinc oxide, about 2.85% by weight dicyandiamide, about 0.38% by weight N,N dimethyl phenyl urea, and about 0.57% by weight azodicarbonamide. In certain applications where increased compressive strength and reduced foaming and expansion is desired, the foregoing may be adjusted such that the polystyrene is reduced to about 12.63% by weight, the SBS block copolymer reduced to about 22.59% by weight, and the butadiene acrylonitrile rubber is increased to about 2.85% by weight.

The material 22 can be formed by mixing the SBS block co-polymer with a small portion (about ¹⁄₄₀th of the total amount) of the bisphenol A-based liquid epoxy resin in a heated mixer until the temperature of the mixture reaches from about 240–260° F. (the temperature of the mixture within the mixer is at least about 175° F.) and the mixture is substantially homogeneous, at which time the polystyrene is added to the mixer and mixing is continued. After the polystyrene is substantially mixed with the SBS block copolymer/epoxy resin mixture, the remainder of the bisphenol A-based epoxy resin is slowly added to the mixer, stopping and starting the mixer as necessary, with the ingredients being thoroughly mixed to obtain a substantially homogeneous mixture. The desired amount of this mixture is placed in a heated mixer (set at a temperature of about 250° F.) and mixing is commenced. While mixing, the carbon black and rubber are added to the mixer, and mixing is stopped once a homogeneous mixture is obtained within the mixer. Either the silica or glass microspheres is added to the mixer, and mixing is resumed and continued until the mixture is homogeneous. This step is repeated, adding the other of the silica or glass microspheres.

The temperature of the mixer is then set to a temperature below 160° F., the blowing agent(s), catalyst(s), kicker, and curing agent(s) are added, and mixing is resumed and continued only until the mixture is homogeneous. The resulting mixture is then preferably extruded into strands (at an extruder temperature of 170–180° F. and screw rotation speeds of about 400 rpm) and cut into pellets. The resulting pellets are injection molded at a temperature of about 180–200° F. using injection molding equipment designed to form the desired shape of the portion to be attached to the carrier 20.

Figure 2:
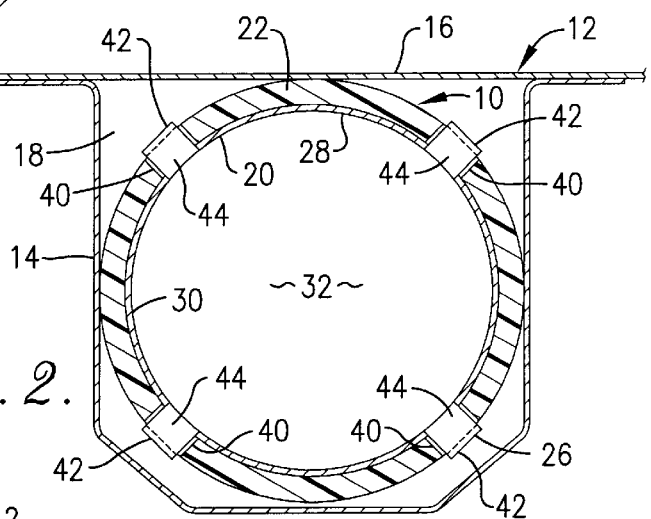
FIG. 2 is a vertical cross sectional view of the tubular reinforcing member of FIG. 1 located within the structural member with the reinforcing material in an unexpanded condition.
Figure 3:
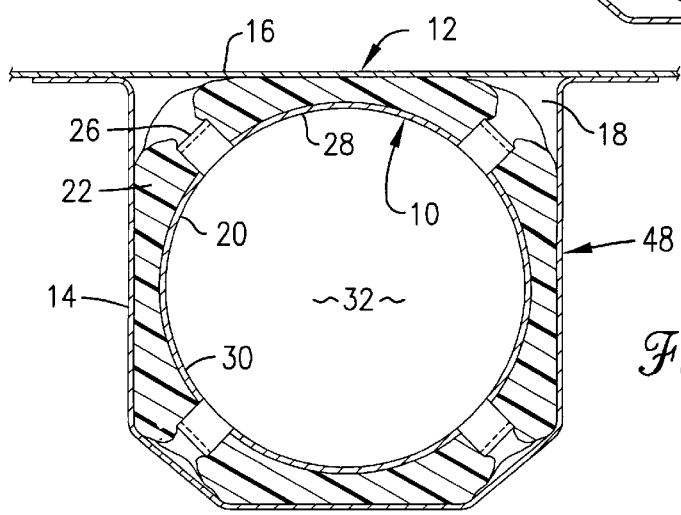
FIG. 3 is a vertical cross-sectional view similar to FIG. 2, showing the reinforcing material in an expanded condition after activation.

The reinforcing material 22 as shown in FIGS. 1–3 is provided as a plurality of separate, longitudinally spaced annular reinforcing elements 34, 36 and 38. Each of the elements 34, 36 and 38 is of a thickness preferably sufficient to engage the surrounding structural member 12 at least two locations, and to provide sufficient material to expand upon activation and substantially engage the interior of the reinforcing member surrounding the elements, but not so great as to completely fill the cavity. Thus, the reinforcing material, upon expansion of at least about 40% and more preferably at least 125%, and most preferably from about 150–300%, would not completely fill the cavity. Typically, a material thickness of the elements between about 5 mm and 5 cm would be sufficient. A plurality of circumferentially spaced slots 40 pass through the thickness T of the material elements 34, 36 and 38.

The fasteners 26 are provided as resilient or bendable tabs 42 formed in the carrier 20. Cuts are made in a metal carrier 20 or the tabs may be formed when molding the carrier 20 if provided of synthetic resin material. The tabs 42 include a stretch 44 approximating the thickness of the material elements, and a finger 46 preferably greater than the width of the slots 40 to grip and hold the material elements 34, 36 and 38 against rotational or longitudinal displacement.

In use, the reinforcing member 10 is placed in the cavity 18 and may, if desired, be temporarily held in position by lugs or bends formed on the structural member 12, adhesive, mechanical fasteners or the like sufficient merely to hold the reinforcing member against longitudinal displacement prior to activation. The structural member is then placed in an oven and baked in an oven at a temperature of at least about 300° F. and more preferably about 325° F. for a period of between about 10 to about 30 minutes which causes the material to foam, and may be cooled at room temperature and thereafter again placed into the oven for a similar period. After cooling, the reinforcing material will have expanded by foaming and bonded to the interior of the structural member as shown in FIG. 3. The resulting reinforced structural member 48 will include the tubular carrier 20 bonded by the reinforcing material 22 whereby additional stiffness and strength is imparted to the structural member without the added weight which would result if the cavity 18 were completely filled with the reinforcing material.

Figure 4:
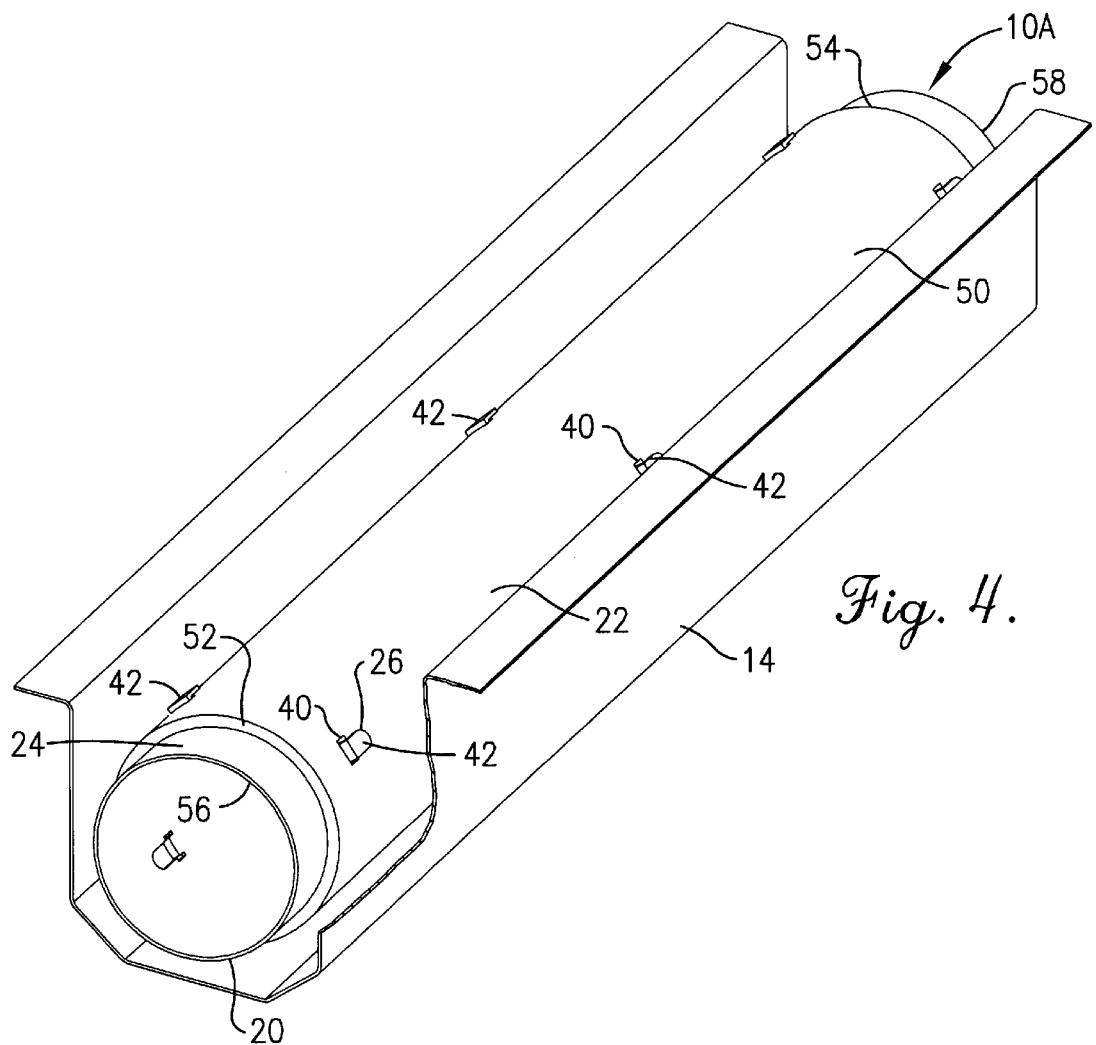
FIG. 4 is a perspective view of a second embodiment of the tubular reinforcing material of the present invention, wherein the reinforcing material is provided as a sleeve around the carrier.
Figure 5:
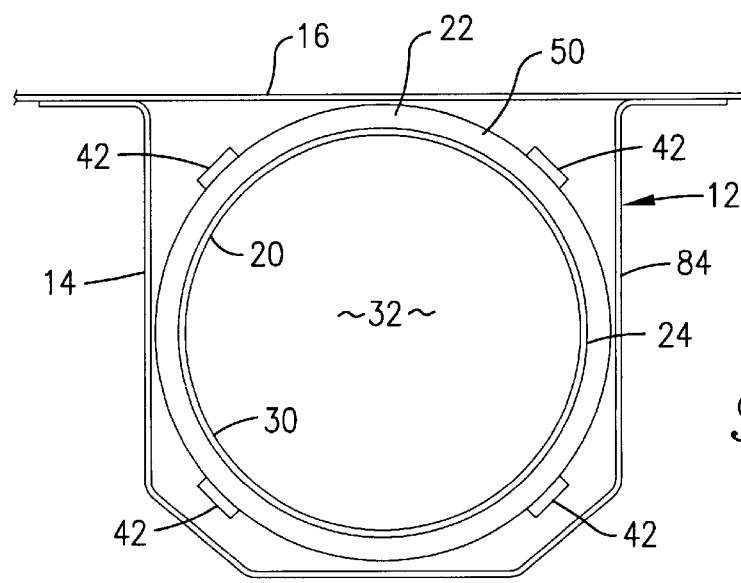
FIG. 5 is an end view of the reinforcing member of FIG. 4 located in the cavity of the structural member.

A second embodiment of the tubular reinforcing member 10A is shown in FIGS. 4 and 5. In this embodiment, the carrier 20 is configured as described above including the fasteners 26 being provided as bendable or resilient tabs. However, the reinforcing material 22 is provided as an elongated sleeve 50 having end margins 52 and 54 inwardly recessed from the respective end edges 56 and 58 of the carrier 20. In this configuration, additional reinforcing material 22 is provided for increased stiffening and bonding along substantially the length of the carrier 20 after heating to expand and bond the material 22. FIG. 5 illustrates the end elevational view of the reinforcing member 10A, it being appreciated that FIG. 3 also illustrates the appearance of the resulting reinforced structural member including the reinforcing member 10A in section after heating, expansion by foaming, and bonding.

A third embodiment of the tubular reinforcing member 10B is shown in FIGS. 6, 7 and 8. A tubular carrier 62 is provided as described above but omits the tabs, instead including a plurality of circumferentially and longitudinally spaced holes 64 through the continuous arcuate wall 66. The reinforcing material 22 is provided as a plurality of elongated substantially prism-shaped elements 68, 70, 72 and 74 having a radially inner margin 76 which is arcuate and substantially conforms to the outer surface 78 of the tubular carrier wall 66. Advantageously, the exterior surfaces 80 and 82 of elements 68 and 70 intersect at right angles to fit into corresponding corners of the structural member 12 between the side walls 84 and 86 and the plate 16. Similarly, the elements 72 and 74 have exterior surfaces 88 and 90 oriented at right angles to lie flat against and engage the inside of walls 84 and 86 and base 92, and further a beveled surface 94 to lie flat against and engage the inside of inclined walls 96 and 98 of the structural member 12. It may be appreciated that the configuration of the elements 68, 70, 72 and 74 may be molded to conform to the inner surface of variously shaped structural members, the foregoing being illustrative only. Each of the elements 68, 70, 72 and 74 is held in position by fasteners 26, which are preferably nylon push pins 100 or threaded fasteners which provide yielding and shock absorption upon impact prior to expansion and bonding and serve to retain the elements 68, 70, 72 and 74 in their desired orientation. Each element is thus provided with a recess 102 and an opening 104 in registry with holes 64 for enabling insertion of the pins 100 therethrough as shown in FIGS. 6–8.

Upon baking of the reinforcing member 10B within the structural member 12 as described above, the resulting reinforced structural member 106 is provided as shown in FIG. 8, with the elements 68, 70, 72 and 74 foaming to expand and bond the carrier to the surrounding structural member.

The resulting reinforced structural member in accordance with the invention is substantially lighter than if the cavity 18 were simply filled with structural foam or the like, and has increased stiffness affording strength and dampening vibrations.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example, while the carrier as described herein is shown generally of metal such as steel or aluminum, it may also be provided of nylon or other synthetic resin having a melting temperature substantially above the temperature at which the reinforcing material 22 melts and expands. Additionally, the reinforcing material may be provided of other compositions such as two-component foaming compositions which have an exothermic chemical reaction when combined which will react and foam to bond the carrier to the structural member after curing.

The inventors hereby state their intent to rely on the Doctrine of Equivalents to determine and assess the reasonably fair scope of their invention as pertains to any apparatus not materially departing from but outside the literal scope of the invention as set out in the following claims.

What is claimed is:

1. A reinforced structural member comprising:
   the structure member defining a cavity;
   a tubular carrier received in said cavity;
   a dry, initially non-tacky thermally expansible reinforcing material; and
   a fastener mechanically fastening the thermally expansible reinforcing material to said carrier, whereupon after expansion of said reinforcing material the carrier is bonded to the structural member.

2. The reinforced structural member of claim 1, wherein said tubular carrier comprises an outer surface and said reinforcing material is positioned against said outer carrier surface.

3. The reinforced structural member of claim 2, wherein said tubular carrier comprises a circular periphery and said reinforcing material is against said outer carrier surface around substantially all of said periphery.

4. The reinforced structural member of claim 2, wherein said tubular carrier comprises a length and said reinforcing material is against said outer carrier along substantially all of said length so as to form a sleeve around said tubular carrier.

5. The reinforced structural member of claim 4, wherein said reinforcing material comprises a plurality of elongated strips along substantially all of said length.

6. The reinforced structural member of claim 5, wherein each of said strips comprises a side which is arcuate in cross-section and said arcuate side is positioned against said carrier outer surface.

7. The reinforced structural member of claim 6, wherein said tubular carrier includes at least two openings and wherein at least one of said strips comprises at least two openings perpendicular to the longitudinal axis of said strip and corresponding to the openings on the carrier, said fastener engaging one of said strip openings with one of the carrier openings so as to fasten said strips to said carrier.

8. The reinforced structural member of claim 7, wherein said fastener comprises a push-pins.

9. The reinforced structural member of claim 2, wherein said tubular carrier comprises a circular periphery and said reinforcing material comprises a ring-shaped member surrounding a portion of said tubular carrier.

10. The reinforced structural member of claim 2, wherein said fastener comprises a bend tab.

11. The reinforced structural member of claim 10, wherein said bend tab is integrally formed with said tubular carrier.

12. The reinforced structural member of claim 11, wherein said bend tab passes through an opening in said reinforcing material for securing said material to said carrier.

13. The reinforced structural member of claim 3, wherein said fastener comprises a bend tab.

14. The reinforced structural member of claim 4, wherein said fastener comprises a bend tab.

15. The reinforced structural member of claim 1, wherein said structural member is a rail of a motor vehicle.

16. The reinforced structural member of claim 1, wherein said structural member is a frame of a motor vehicle.

17. The reinforced structural member of claim 1, wherein said tubular carrier is formed of a material selected from the group consisting of steel, aluminum, and nylon.

18. The reinforced structural member of claim 1, wherein said reinforcing material comprises an SBS block co-polymer, a polystyrene, a rubber, a bisphenol A-based liquid epoxy resin, carbon black, silica, glass microspheres, a blowing agent, a catalyst, and a curing agent.

\* \* \* \* \*